United States Patent
Xiang et al.

(10) Patent No.: US 9,874,769 B2
(45) Date of Patent: Jan. 23, 2018

(54) CLOTH ATTACHMENT DEVICE AND CLOTH ATTACHMENT METHOD USING THE SAME

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Qiang Xiang, Beijing (CN); Laifeng Liu, Beijing (CN); Jiayong Dong, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 204 days.

(21) Appl. No.: 14/739,165

(22) Filed: Jun. 15, 2015

(65) Prior Publication Data

US 2016/0195738 A1    Jul. 7, 2016

(30) Foreign Application Priority Data

Jan. 4, 2015    (CN) .......................... 2015 1 0001913

(51) Int. Cl.
B29C 65/48    (2006.01)
B32B 37/10    (2006.01)
(Continued)

(52) U.S. Cl.
CPC ........ *G02F 1/1303* (2013.01); *B32B 37/0046* (2013.01); *B65H 81/06* (2013.01); *B32B 2457/20* (2013.01); *G02F 1/133784* (2013.01)

(58) Field of Classification Search
USPC ....... 156/247, 249, 289, 391, 537, 538, 580, 156/582
See application file for complete search history.

(56) References Cited

U.S. PATENT DOCUMENTS

| | | | |
|---|---|---|---|
| 2003/0108712 A1* | 6/2003 | Tabira | G02F 1/133784 428/96 |
| 2004/0108281 A1* | 6/2004 | Gerteis | B04B 3/02 210/781 |
| 2016/0046068 A1* | 2/2016 | Yu | B29C 63/06 156/247 |

FOREIGN PATENT DOCUMENTS

CN    104020610 A    9/2014
CN    104155807 A    11/2014
(Continued)

OTHER PUBLICATIONS

Machine Translation of JP H08-160428 (May 24, 2017).*
(Continued)

*Primary Examiner* — Sing P Chan
(74) *Attorney, Agent, or Firm* — Brooks Kushman P.C.

(57) ABSTRACT

A cloth attachment device includes a frame, and further includes: a first roller arranged on the frame and capable of being rotated around its axis relative to the frame; a transmission mechanism arranged on the frame and capable of being moved relative to the frame, a to-be-attached cloth being arranged between the first roller and the transmission mechanism, two opposite surfaces of the to-be-attached cloth being in contact with a first position on the transmission mechanism and a second position on the first roller, respectively; and a driving mechanism configured to drive the first roller to rotate and drive the transmission mechanism to move in such a manner that the first position and the second position are moved in an identical direction, thereby to enable, through the transmission mechanism, the to-be-attached cloth between the first roller and the transmission mechanism to be curled up around the first roller.

16 Claims, 5 Drawing Sheets

(51) Int. Cl.
  *B32B 37/12*   (2006.01)
  *B32B 37/28*   (2006.01)
  *B32B 38/10*   (2006.01)
  *B32B 39/00*   (2006.01)
  *B32B 43/00*   (2006.01)
  *G02F 1/13*    (2006.01)
  *B32B 37/00*   (2006.01)
  *B65H 81/06*   (2006.01)
  *G02F 1/1337*  (2006.01)

(56) References Cited

FOREIGN PATENT DOCUMENTS

| JP | H08-152637 A | 6/1996 |
| JP | H08-160428   | 6/1996 |
| JP | 2010-191136 A | 9/2010 |

OTHER PUBLICATIONS

Office Action in Chinese Patent Application No. 201510001913.X, dated Dec. 20, 2016.
Second Office Action for Chinese Application No. 201510001913.X, dated Jun. 13, 2017, 9 Pages.

\* cited by examiner

CLOTH ATTACHMENT DEVICE AND CLOTH ATTACHMENT METHOD USING THE SAME

CROSS-REFERENCE TO RELATED APPLICATION

The present application claims a priority of the Chinese patent application No. 201510001913.X filed on Jan. 4, 2015, which is incorporated herein by reference in its entirety.

TECHNICAL FIELD

The present disclosure relates to the field of display manufacturing, in particular to a cloth attachment device and a cloth attachment method using the cloth attachment device.

BACKGROUND

During the manufacture of a liquid crystal display device, an alignment process performed on an alignment film is indispensable. This alignment process includes a step of rubbing surfaces of the alignment films on an array substrate and a color filter substrate with a rubbing roller in a direction, so as to form grooves on the surfaces of the alignment films arranged in a direction by using the rubbing of a rubbing cloth on the rubbing roller. In this way, liquid crystal molecules of a liquid crystal layer are arranged at a predetermined angle through the alignment films.

For the above-mentioned rubbing process, the rubbing roller is indispensable. Prior to the rubbing, it is required to manufacture the rubbing roller using a cloth attachment device, and the manufacturing efficiency of the rubbing rollers directly affects the yield of the liquid crystal display device.

As shown in FIG. 1, which is a schematic view showing an existing cloth attachment device, the cloth attachment device includes a base 1, a table 2, a gantry frame 3, baffles 4 arranged at both sides of the gantry frame 3, rollers 5, a clamping unit for clamping the rollers 5, a sliding rail 7 arranged on the base 1, a to-be-attached cloth 8 arranged on the table 2, a rubber pad 9 arranged at a lower surface of the to-be-attached cloth 8, and a display 10 for displaying an attachment procedure of the rollers 5. The rollers 5 are fixed onto the gantry frame 3 through the clamping unit 6, and can rotate relative to the gantry frame 3. As shown in FIGS. 1 and 2, the cloth is attached as follows by the cloth attachment device with such a structure. The gantry frame 3 drives the rollers 5 by the clamping unit 6 to move down onto a surface of the table 2 (e.g., position a in FIG. 2), so as to press against the to-be-attached cloth on the rubber pad 9. Next, the gantry frame 3 moves along the sliding rail 7, and meanwhile drives the rollers 5 to fittingly rotate on the to-be-attached cloth 8, so as to curl up the to-be-attached cloth 8 during the rotation (position b in FIG. 2). Then, the gantry frame 3 drives the rollers 5 by the clamping unit 6 to move up to a position c and move back to be right above an initial attachment position (position d in FIG. 2). And then, the gantry frame 3 drives the rollers 5 again by the clamping unit 6 to move down to the initial attachment position, so as to press against the rubber pad 9 and repeat the above-mentioned curling operation, thereby to attach the rubbing cloth in a better manner.

During the cloth attachment procedure, the gantry frame 3 needs to moves along the sliding rail 7, so as to drive the rollers 5, thereby to curl up the to-be-attached cloth preliminarily. Then, the rollers 5 need to move up and down, press against the rubber pad 9 and rotate on the rubber pad 9 for multiple times, so as to attach the rubbing cloth on the rollers 5 in a better manner. Hence, the gantry 3 must drive the rollers 5 to move back and forth, and move up and down continuously. However, it will take a lot of time for the back-and-forth as well as the up-and-down movements of the rollers 5, while it takes very little time to curl up the cloth. In addition, during the attachment, there exist many zero return actions, so the entire process is very complex and the operation is inconvenient.

SUMMARY

An object of the present disclosure is to provide a cloth attachment device and a cloth attachment method using the cloth attachment device, so as to, as compared with the related art, simplify the cloth attachment, facilitate the operation and improve the attachment efficiency.

In one aspect, the present disclosure provides in one embodiment a cloth attachment device, including a frame. The cloth attachment device further includes:

a first roller arranged on the frame and capable of being rotated around its axis relative to the frame;

a transmission mechanism arranged on the frame and capable of being moved relative to the frame, a to-be-attached cloth being arranged between the first roller and the transmission mechanism, two opposite surfaces of the to-be-attached cloth being in contact with a first position on the transmission mechanism and a second position on the first roller, respectively; and a driving mechanism configured to drive the first roller to rotate and drive the transmission mechanism to move in such a manner that the first position and the second position are moved in an identical direction, thereby to enable, through the transmission mechanism, the to-be-attached cloth between the first roller and the transmission mechanism to be curled up around the first roller.

Alternatively, the transmission mechanism includes a second roller capable of being rotated around its axis relative to the frame. The axis of the second roller is parallel to the axis of the first roller, and the to-be-attached cloth is arranged between the first roller and the second roller and parallel to the axes of the first roller and the second roller.

Alternatively, a plurality of first positions are arranged on the first roller and at a first straight line, a plurality of second positions are arranged on the second roller and at a second straight line, and the first straight line and the second straight line are both parallel to the axes of the first roller and the second roller.

Alternatively, a distance between the first straight line and the second straight line is less than a thickness of the to-be-attached cloth, and a difference between the thickness of the to-be-attached cloth and the distance is 1 mm to 2 mm.

Alternatively, the frame includes a horizontally-disposed table, and the to-be-attached cloth is arranged on the table. The first roller is arranged above the table and the second roller is arranged below the table.

Alternatively, an outer layer of the second roller is covered with a rubber material.

Alternatively, when the first roller and the second roller are driven by the driving mechanism to rotate in opposite directions, the to-be-attached cloth between the first roller and the transmission mechanism is curled up around the first roller.

Alternatively, the first roller and the second roller are rotated at an identical rate.

Alternatively, the first roller is of a diameter identical to the second roller.

Alternatively, the to-be-attached cloth is a double-sided adhesive tape including cover layers arranged at upper and lower surfaces, and an adhesive layer arranged between the cover layers. The cover layer of the double-sided adhesive tape facing the first roller is peeled off.

Alternatively, the to-be-attached cloth is a rubbing cloth, and an outer surface of the first roller is covered with a double-sided adhesive tape with its cover layer being peeled off.

Alternatively, the driving mechanism includes a servo motor.

Alternatively, the frame includes:

a vertically-disposed gantry frame; and a clamping mechanism secured onto the gantry frame and configured to secure the first roller onto the gantry frame.

Alternatively, the second roller is secured onto the frame through a rolling bearing.

Alternatively, the frame includes a horizontally-disposed frame, and the transmission mechanism includes a transportation body arranged on the frame and capable of being translated relative to a surface of the frame. The transportation body is of a planar surface, the to-be-attached cloth is laid on the transportation body, and the first roller is arranged above the transportation body.

Alternatively, a gap between the first roller and the transportation body is slightly less than the thickness of the to-be-attached cloth.

In another aspect, the present disclosure provides in one embodiment a cloth attachment method using the above-mentioned cloth attachment device, including steps of:

arranging a to-be-attached cloth between a first roller and a transmission mechanism;

adjusting a gap between the first roller and the transmission mechanism in such a manner than edges of the to-be-attached cloth at two opposite surfaces are in contact with a first position on the transmission mechanism and a second position on the first roller, respectively; and enabling a driving mechanism to drive the first roller to rotate and drive the transmission mechanism to move in such a manner that the first position and the second position are moved in an identical direction, thereby to enable the to-be-attached cloth between the first roller and the transmission mechanism to be curled up around the first roller.

Alternatively, the to-be-attached cloth is a double-sided adhesive tape, and prior to the step of arranging the to-be-attached cloth between the first roller and the transmission mechanism, the method further includes peeling off a cover layer of the double-sided adhesive tape facing the first roller.

Alternatively, the to-be-attached cloth is a rubbing cloth, and prior to the step of arranging the to-be-attached cloth between the first roller and the transmission mechanism, the method further includes attaching a double-sided adhesive tape onto the first roller, and peeling off a cover layer arranged at an outer layer of the double-sided adhesive tape attached onto the first roller.

Alternatively, the transmission mechanism includes a second roller capable of being rotated around its axis relative to the frame, the axis of the second roller is parallel to the axis of the first roller, and the to-be-attached cloth is arranged between the first roller and the second roller and parallel to the axes of the first roller and the second roller. The cloth attachment method further includes, when the first roller and the second roller are driven by the driving mechanism to rotate in opposite directions, enabling the to-be-attached cloth between the first roller and the transmission mechanism to be curled up around the first roller.

According to the embodiments of the present disclosure, the transmission mechanism is provided, and the to-be-attached cloth is arranged between the first roller and the transmission mechanism. Relative to the two opposite surfaces of the to-be-attached cloth, the transmission mechanism and the first roller are moved in an identical direction, and a thrust force is applied by the transmission mechanism so that the to-be-attached cloth is curled up around the first roller. In this way, when the first roller is continuously rotated by a predetermined number of turns, the to-be-attached cloth is curled up and attached onto the first roller. As a result, it is able to perform the cloth attachment in a simple and convenient manner without any up-and-down movements and zero return actions of the first roller, thereby to improve the attachment efficiency.

DETAILED DESCRIPTION

Figure 1:
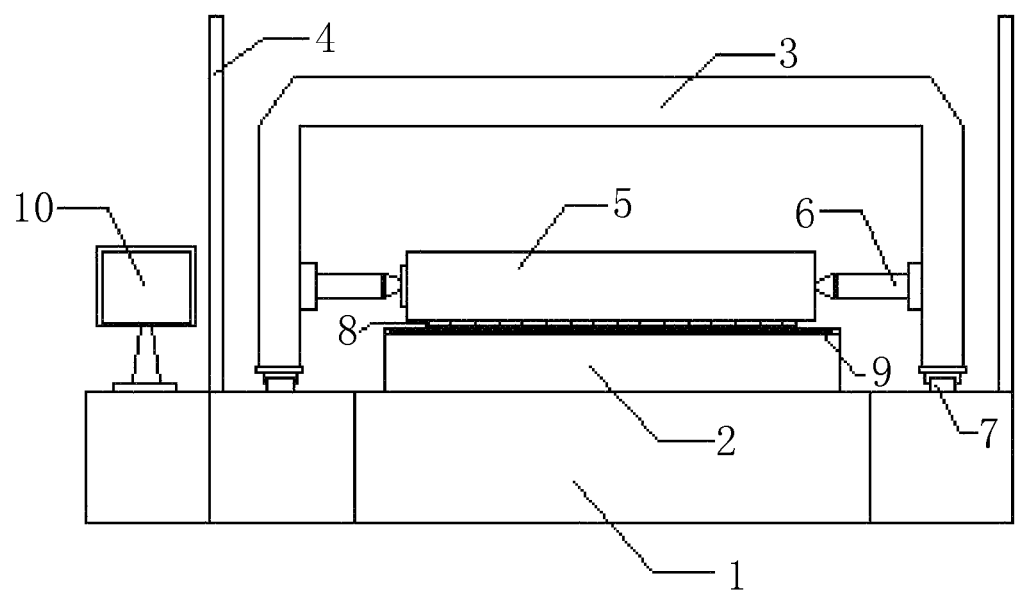
FIG. 1 is a schematic view showing an existing cloth attachment device.
Figure 2:
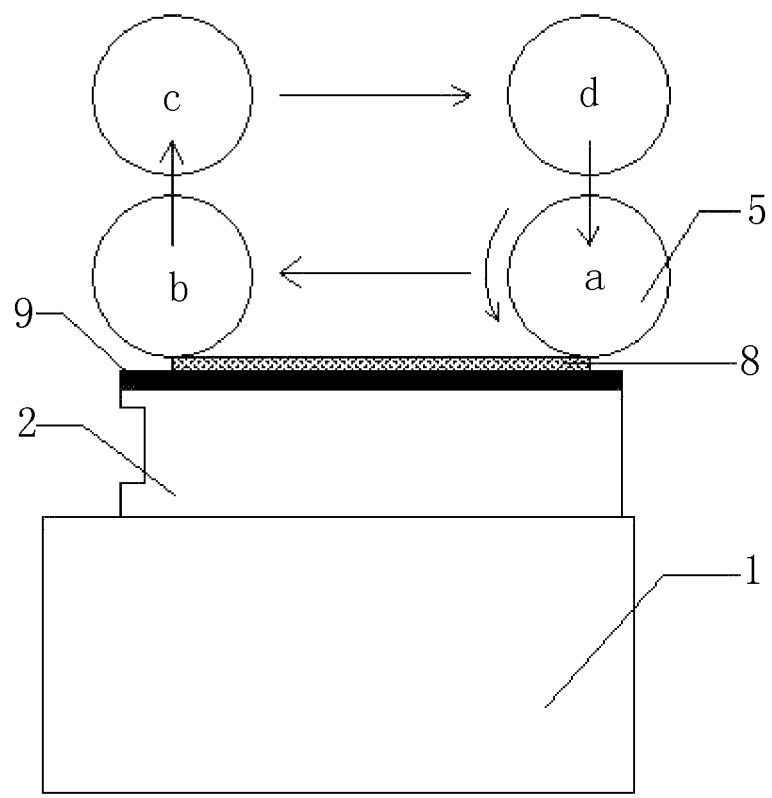
FIG. 2 is a schematic view showing the movement of a roller during the cloth attachment by the existing cloth attachment device.

In order to make the objects, the technical solutions and the advantages of the present disclosure more apparent, the present disclosure will be described hereinafter in conjunction with the drawings and the embodiments. Obviously, the following embodiments are merely a part of, rather than all of the embodiments of the present disclosure, and based on these embodiments, a person skilled in the art may, without any creative effort, obtain other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in one embodiment a cloth attachment device including a frame. The cloth attachment device further includes:

a first roller arranged on the frame and capable of being rotated around its axis relative to the frame;

a transmission mechanism arranged on the frame and capable of being moved relative to the frame, a to-be-attached cloth being arranged between the first roller and the transmission mechanism, two opposite surfaces of the to-be-attached cloth being in contact with a first position on the transmission mechanism and a second position on the first roller, respectively; and a driving mechanism configured to drive the first roller to rotate and drive the transmission mechanism to move in such a manner that the first position and the second position are moved in an identical direction, thereby to enable, through the transmission mechanism, the to-be-attached cloth between the first roller and the transmission mechanism to be curled up around the first roller.

According to the cloth attachment device in the embodiment of the present disclosure, the transmission mechanism is provided, and the to-be-attached cloth is arranged between the first roller and the transmission mechanism. Relative to the two opposite surfaces of the to-be-attached cloth, the transmission mechanism and the first roller are moved in an identical direction, and a thrust force is applied by the transmission mechanism so that the to-be-attached cloth is curled up around the first roller. In this way, when the first roller is continuously rotated by a predetermined number of turns, the to-be-attached cloth is curled up and attached onto the first roller. As a result, it is able to perform the cloth attachment in a simple and convenient manner without any up-and-down movements and zero return actions of the first roller, thereby to improve the attachment efficiency.

Further, during the attachment, the first roller is stationary. Apart from being rotated, it is unnecessary for the first roller to move up and down, or even perform a zero return action or alignment repeatedly. As a result, it is able to prevent a rubber pad below the to-be-attached cloth from being offset, thereby to perform the cloth attachment in an accurate manner, without any offset.

During the manufacture of a display device, a double-sided adhesive tape is attached onto a roller and then a rubbing cloth is attached thereto, so as to form a rubbing roller. In the embodiments of the present disclosure, the to-be-attached cloth may be a double-sided adhesive tape or a rubbing cloth. When the to-be-attached cloth is the rubbing cloth, it is required to attach a double-sided adhesive tape onto the first roller at first.

The structure of the cloth attachment device in a first embodiment will be described hereinafter in conjunction with FIGS. 3 to 6. In the first embodiment, the cloth attachment device includes the frame, the first roller, the transmission mechanism and the driving mechanism. To be specific, the transmission mechanism includes a second roller capable of being rotated around its axis relative to the frame, and the axis of the second roller is parallel to the axis of the first roller. The to-be-attached cloth is arranged between the first roller and the second roller and parallel to the axes of the first roller and the second roller.

In the first embodiment, two opposite surfaces of the to-be-attached cloth arranged between the first roller and the second roller are in contact with the first roller and the second roller, respectively. When the first roller is rotated in a direction opposite to the second roller, e.g., when the first roller is rotated in a counterclockwise direction and the second roller is rotated in a clockwise direction, the two surfaces of the to-be-attached cloth are moved in an identical direction relative to each other. Hence, a thrust force is applied by the second roller to the first roller and the to-be-attached cloth in the rotation direction of the first roller. After the first roller is rotated by a predetermined number of turns, the entire to-be-attached cloth is curled onto the first roller, and then the first roller continues to rotate, so as to further attach the to-be-attached cloth onto the first roller by means of a pressure applied by the second roller onto the first roller and the to-be-attached cloth.

Figure 3:
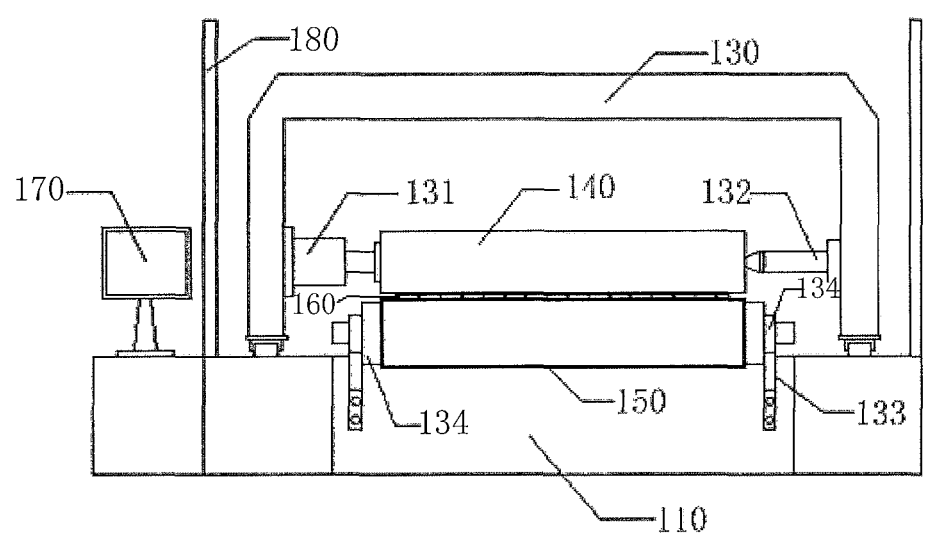
FIG. 3 is a front view of a cloth attachment device according to a first embodiment of the present disclosure.
Figure 4:
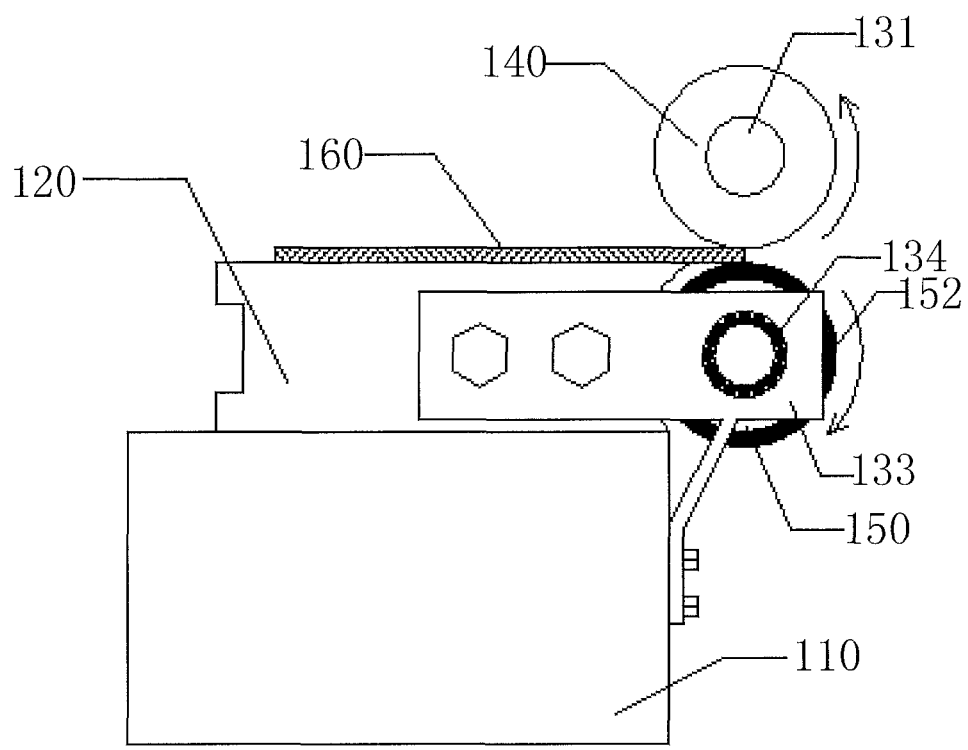
FIG. 4 is a partial, side view of the cloth attachment device according to the first embodiment of the present disclosure.

To be specific, referring to FIGS. 3 and 4, the cloth attachment device in the first embodiment includes a frame, a first roller 140 and a second roller 150.

In this embodiment, the frame may be of a structure identical to that in the related art. It may include a base 110, a table 120 and a gantry frame 130. The table 120 and the gantry frame 130 are both arranged on the base 110. It should be appreciated that, the structure of the frame is not limited to the above.

The first roller 140 is arranged on the frame and capable of being rotated around its axis relative to the frame. In this embodiment, a rotary shaft 131 and a clamping rod 132 are arranged opposite to each other on the gantry frame 130. The first roller 140 is arranged between the rotary shaft 131 and the clamping rod 132, and rotated relative to the gantry frame 130 through the rotary shaft 131.

The second roller 150 is arranged on the frame and capable of being rotated around its axis relative to the frame. In this embodiment, the axis of the second roller 150 is parallel to the axis of the first roller 140, and as shown in FIG. 3, they are both arranged in a horizontal direction. In addition, the second roller 150 is secured onto the base 110 through a bracket 133, two ends of which are provided rolling bearings 134. A rotary shaft of the second roller 150 is connected to the bracket 133 after passing through the rolling bearing 134, and it is capable of being rotated around its axis relative to the bracket 133.

Further, as shown in FIG. 4, the table 120 is arranged horizontally. Prior to the operation of the cloth attachment device, a to-be-attached cloth 160, which is required to be curled onto the first roller 140, is laid onto the table 120. The first roller 140 is arranged above the table 120, the second roller 150 is arranged below the table 120, and they are located at edges of the table 120. A portion of the to-be-attached cloth 160 extending outward from the edge of the table 120 is sandwiched between the first roller 140 and the second roller 150.

Figure 5:
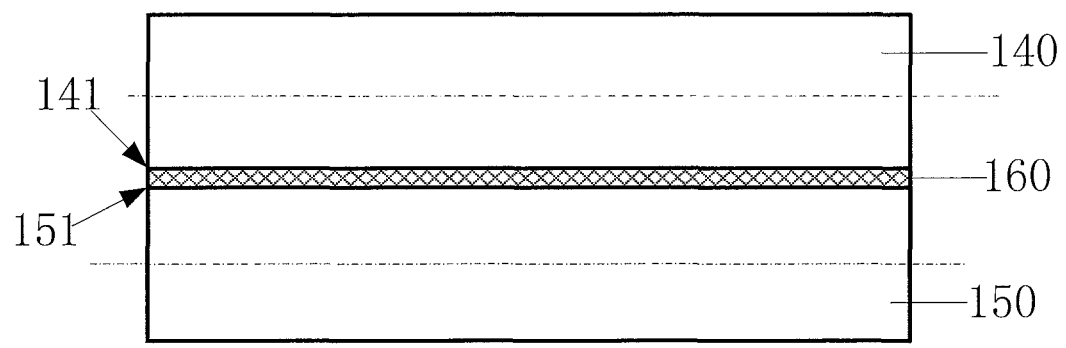
FIG. 5 is a schematic view showing an attachment relationship among a first roller, the cloth attachment device and a second roller.

Prior to the attachment and during the curling of the to-be-attached cloth onto the first roller 140, the to-be-attached cloth 160 is arranged between the first roller 140 and the second roller 150. As shown in FIG. 5, a plurality of positions on an upper surface of the to-be-attached cloth 160 is in contact with the first roller 140, and these positions are arranged in a first straight line 141. A plurality of positions on a lower surface of the to-be-attached cloth 160 is in contact with the second roller 160, and these positions are arranged in a second straight line 151. The first straight line 141 and the second straight line 151 are both parallel to the axes of the first roller 140 and the second roller 150.

Figure 6:
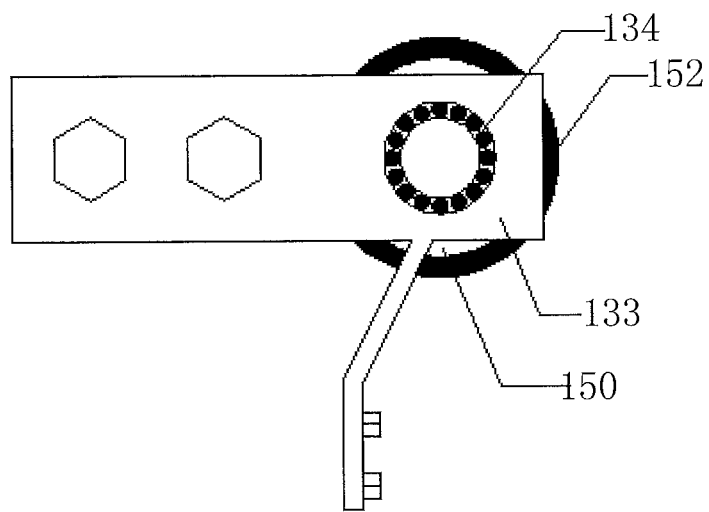
FIG. 6 is a schematic view showing a mounting structure of the second roller.

In addition, referring to FIGS. 4, 5 and 6, the first straight line 141 is a lowermost end of the first roller 140, i.e., a generatrix line closest to the second roller 150, and the second straight line 151 is an uppermost end of the second roller 150, i.e., a generatrix line closest to the first roller 140. Hence, a distance between the first straight line 141 and the second straight line 151 is just a gap between the first roller 140 and the second roller 150. In this embodiment, in order to support the to-be-attached cloth 160 by the second roller 150, alternatively, the distance between the first straight line 141 and the second straight line 151 is less than a thickness of the to-be-attached cloth 160, and equal to a value obtained by subtracting a press-in amount (about 1 mm to 2 mm) from the thickness of the to-be-attached cloth 160, i.e., a difference between the thickness of the to-be-attached cloth 160 and the distance between the first straight line 141 and the second straight line 151 is within a range from 1 mm to 2 mm. Hence, for the to-be-attached clothes with different thicknesses, the gaps between the first roller 140 and the second roller 150 are different too. In addition, alternatively, an outer layer of the second roller 150 is covered with a rubber material. A barrel-like rubber pad 152 is formed around the second roller 150, as shown in FIGS. 4 and 6. Due to the elasticity of the barrel-like rubber pad 152, when the gap between the first roller 140 and the second roller 150 is slightly less than the thickness of the to-be-attached cloth 160, the to-be-attached cloth 160 is pushed into between the first roller 140 and the second roller 150, and supported elastically by the barrel-like rubber pad 152.

Referring to FIG. 4, during the operation of the cloth attachment device, the first roller 140 is rotated in a direction opposite to the second roller 150, but they are moved in an identical direction relative to the two surfaces of the to-be-attached cloth 160. A thrust force may be applied by the second roller 150 to the first roller 140 and the to-be-attached cloth 160 in the rotation direction of the first roller 140. After the first roller 140 is rotated by the predetermined number of turns, the entire to-be-attached cloth 160 is curled up to the first roller 140. Then, the first roller 140 continues to rotate, so as to attach the to-be-attached cloth 160 onto the first roller 140 by means of a pressure applied by the second roller 150 onto the first roller 140 and the to-be-attached cloth 160, thereby to complete the procedure of curling up the to-be-attached cloth.

In the first embodiment, alternatively, the first roller 140 is of a diameter identical to the second roller 150, and they are rotated at an identical speed when rotated in opposite direction. In addition, the driving mechanism for driving the first roller 140 and the second roller 150 to rotate may include a servo motor. To be specific, the first roller 140 and the second roller 150 may be driven by different servo motors, or by a single servo motor, so as to rotate at an identical speed in opposite direction.

In addition, referring to FIG. 3, in the first embodiment, the cloth attachment device may further include a display 170 for displaying the entire attachment procedure, and baffles 180 arranged at both sides of the gantry frame 3.

The cloth attachment device in the first embodiment may be used to manufacture a rubbing roller for a rubbing process, specifically by curling up a double-sided adhesive tape and curling up a rubbing cloth by the roller attached with the double-sided adhesive tape.

Referring to FIGS. 3 to 6, the to-be-attached cloth in this embodiment may be a double-sided adhesive tape. It should be appreciated that, the unused double-sided adhesive tape includes cover layers arranged at its upper and lower surfaces, as well as an adhesive layer arranged between the two cover layers. Based on the structure of the double-sided adhesive tape, when curling up the double-sided adhesive tape by the cloth attachment device in this embodiment, it is required to peel off the cover layer at one surface of the double-sided adhesive tape, so as to expose the adhesive layer. Then, the double-sided adhesive tape is laid on the table 120 with its exposed adhesive layer facing the first roller 140 (facing upward in this embodiment) and the remaining cover layer facing the second roller 150. In this way, when the first roller 140 and the second roller 150 are rotated in opposite directions, one surface of the double-sided adhesive tape facing the first roller 140 is adhered onto the first roller 140 due to the adhesive layer, while the other surface facing the second roller 150 is not adhered onto the second roller 150 due to the cover layer. The first roller 140 and the second roller 150 are rotated by several turns, so as to curl up the double-sided adhesive tape onto the first roller 140.

After the double-sided adhesive tape is curled up onto the first roller 140, the rubbing cloth may be curled up onto the first roller 140, and secured thereto by the adhesive layer of the double-sided adhesive tape. Hence, when the to-be-attached cloth is a rubbing cloth, an outer surface of the first roller 140 should have been adhered with the double-sided adhesive tape, and the cover layer thereof should have been peel off to expose the adhesive layer. At this time, the first roller 140 and the second roller 150 are rotated so as to curl up, and adhere, the rubbing cloth onto the first roller 140.

Figure 7:
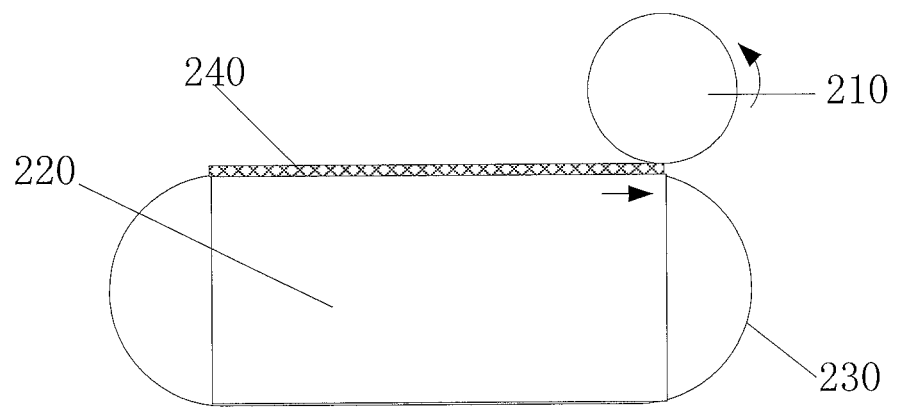
FIG. 7 is a schematic view showing the cloth attachment device according to a second embodiment of the present disclosure.

The cloth attachment device is not limited to the structure mentioned in the first embodiment, e.g., the transmission mechanism may also be a structure similar to a transmission belt. Referring to FIG. 7, in the second embodiment, the cloth attachment device includes a first roller 210 arranged on the frame (not shown) and a transportation body 230 arranged on the table and capable of being translated relative to a surface of a table 220. The transportation body 230 is of a planar surface, and a to-be-attached cloth 240 is laid on the transportation body 230. The first roller 210 is arranged above the transportation body 230, and a gap between the first roller 210 and the transportation body 230 is slightly less than a thickness of the to-be-attached cloth 240. As shown in FIG. 7, when the transportation body 230 is translated to the right, the first roller 210 is rotated in a counterclockwise direction, and the to-be-attached cloth 240 is sandwiched between the first roller 210 and the transportation body 230. The first roller 210 is rotated continuously by several turns due to the support from the transportation body 230 and a thrust force in a rotation direction of the first roller 210, so as to complete the procedure of curling up the to-be-attached cloth 240.

Of course, a person skilled in the art may make various modifications based on a working principle of the cloth attachment device, and they will not be particularly defined herein.

According to the cloth attachment device in the embodiments of the present disclosure, the to-be-attached cloth is arranged and clamped between the first roller and the transmission mechanism, and the first roller is continuously driven by the driving mechanism to rotate by several turns due to a thrust force applied by the transmission mechanism in the rotation direction of the first roller, so as to complete the procedure of curling up the to-be-attached cloth, so the entire procedure is simple and effective. As compared with the related art, it is unnecessary to perform the up-and-down movements and the zero return actions of the first roller, so it is able to improve the efficiency thereof. In addition, it is able to prevent the rubber pad below the to-be-attached cloth from being offset due to the repeated zero return actions and alignments, thereby to perform the cloth attachment in an accurate manner, without any offset.

The present disclosure further provides a cloth attachment method, including:

arranging the to-be-attached cloth between the first roller and the transmission mechanism;

adjusting a gap between the first roller and the transmission mechanism in such a manner than edges of the to-be-attached cloth at two opposite surfaces are in contact with the first position on the transmission mechanism and the second position on the first roller, respectively; and enabling the driving mechanism to drive the first roller to rotate and drive the transmission mechanism to move in such a manner that the first position and the second position are moved in an identical direction, thereby to enable the to-be-attached cloth between the first roller and the transmission mechanism to be curled up around the first roller.

To be specific, when the to-be-attached cloth is a double-sided adhesive tape, prior to the step of arranging the to-be-attached cloth between the first roller and the transmission mechanism, the method further includes peeling off a cover layer of the double-sided adhesive tape facing the first roller. Through this step, the adhesive layer of the double-sided adhesive tape faces the first roller, and when the first roller is rotated, the double-sided adhesive tape is adhered onto the first roller.

In addition, when the to-be-attached cloth is a rubbing cloth, prior to the step of arranging the to-be-attached cloth between the first roller and the transmission mechanism, the method further includes attaching a double-sided adhesive tape onto the first roller, and peeling off a cover layer arranged at an outer layer of the double-sided adhesive tape. Through this step, the adhesive layer of the double-sided adhesive tape on the first roller is exposed, and when the first roller is rotated, the rubbing cloth is curled up, and adhered, onto the first roller.

During manufacture of a rubbing roller using the method mentioned above, it is required to curl up the double-sided adhesive tape to the first roller, and then the rubbing cloth is curled up onto the first roller with the double-sided adhesive tape, so as to obtain the rubbing roller.

The above-mentioned cloth attachment method is simple and convenient, so it is able to improve the manufacturing efficiency of the rubbing roller.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A cloth attachment device, comprising a frame, wherein the cloth attachment device further comprises:
    a first roller arranged on the frame and capable of being rotated around its axis relative to the frame;
    a transmission mechanism arranged on the frame and capable of being moved relative to the frame, a to-be-attached cloth being arranged between the first roller and the transmission mechanism, two opposite surfaces of the to-be-attached cloth being in contact with a first position on the transmission mechanism and a second position on the first roller, respectively; and
    a driving mechanism configured to drive the first roller to rotate and drive the transmission mechanism to move in such a manner that the first position and the second position are moved in an identical direction, thereby to enable, through the transmission mechanism, the to-be-attached cloth between the first roller and the transmission mechanism to be curled up around the first roller, the transmission mechanism comprising a second roller capable of being rotated around its axis relative to the frame, the axis of the second roller being parallel to the axis of the first roller, and the to-be-attached cloth being arranged between the first roller and the second roller and parallel to the axes of the first roller and the second roller,
    a plurality of first positions being arranged on the first roller and at a first straight line, a plurality of second positions being arranged on the second roller and at a second straight line, and the first straight line and the second straight line both being parallel to the axes of the first roller and the second roller, and
    wherein a distance between the first straight line and the second straight line is less than a thickness of the to-be-attached cloth, and a difference between the thickness of the to-be-attached cloth and the distance is 1 mm to 2 mm.

2. The cloth attachment device according to claim 1, wherein the frame comprises a horizontally-disposed table, the to-be-attached cloth is arranged on the table, and the first roller is arranged above the table and the second roller is arranged below the table.

3. The cloth attachment device according to claim 1, wherein an outer layer of the second roller is covered with a rubber material.

4. The cloth attachment device according to claim 1, wherein when the first roller and the second roller are driven by the driving mechanism to rotate in opposite directions, the to-be-attached cloth between the first roller and the transmission mechanism is curled up around the first roller.

5. The cloth attachment device according to claim 4, wherein the first roller and the second roller are rotated at an identical rate.

6. The cloth attachment device according to claim 1, wherein the first roller is of a diameter identical to the second roller.

7. The cloth attachment device according to claim 1, wherein the to-be-attached cloth is a double-sided adhesive tape comprising cover layers arranged at upper and lower surfaces, and an adhesive layer arranged between the cover layers, and the cover layer of the double-sided adhesive tape facing the first roller is peeled off.

8. The cloth attachment device according to claim 1, wherein the to-be-attached cloth is a rubbing cloth, and an outer surface of the first roller is covered with a double-sided adhesive tape with its cover layer being peeled off.

9. The cloth attachment device according to claim 1, wherein the driving mechanism comprises a servo motor.

10. The cloth attachment device according to claim 1, wherein the frame comprises:
    a vertically-disposed gantry frame; and
    a clamping mechanism secured onto the gantry frame and configured to secure the first roller onto the gantry frame.

11. The cloth attachment device according to claim 1, wherein the second roller is secured onto the frame through a rolling bearing.

12. The cloth attachment device according to claim 1, wherein the frame comprises a horizontally-disposed table, the transmission mechanism comprises a transportation body arranged on the table and capable of being translated relative to a surface of the table, the transportation body is of a planar surface, the to-be-attached cloth is laid on the transportation body, and the first roller is arranged above the transportation body.

13. A cloth attachment method using the cloth attachment device according to claim 1, comprising steps of:
    arranging a to-be-attached cloth between a first roller and a transmission mechanism;

adjusting a gap between the first roller and the transmission mechanism in such a manner than edges of the to-be-attached cloth at two opposite surfaces are in contact with a first position on the transmission mechanism and a second position on the first roller, respectively; and enabling a driving mechanism to drive the first roller to rotate and drive the transmission mechanism to move in such a manner that the first position and the second position are moved in an identical direction, thereby to enable the to-be-attached cloth between the first roller and the transmission mechanism to be curled up around the first roller.

14. The cloth attachment method according to claim 13, wherein the to-be-attached cloth is a double-sided adhesive tape, and prior to the step of arranging the to-be-attached cloth between the first roller and the transmission mechanism, the method further comprises:

peeling off a cover layer of the double-sided adhesive tape facing the first roller.

15. The cloth attachment method according to claim 13, wherein the to-be-attached cloth is a rubbing cloth, and prior to the step of arranging the to-be-attached cloth between the first roller and the transmission mechanism, the method further comprises:

attaching a double-sided adhesive tape onto the first roller, and peeling off a cover layer arranged at an outer layer of the double-sided adhesive tape attached onto the first roller.

16. The cloth attachment method according to claim 13, wherein the transmission mechanism comprises a second roller capable of being rotated around its axis relative to the frame, the axis of the second roller is parallel to the axis of the first roller, and the to-be-attached cloth is arranged between the first roller and the second roller and parallel to the axes of the first roller and the second roller, wherein the cloth attachment method further comprises:

when the first roller and the second roller are driven by the driving mechanism to rotate in opposite directions, enabling the to-be-attached cloth between the first roller and the transmission mechanism to be curled up around the first roller.

* * * * *